United States Patent
Hiroumi

[11] 3,894,743
[45] July 15, 1975

[54] COLLET CHUCK

[76] Inventor: Shinbe Hiroumi, 7,4 chome, Ohiraki-cho, Osaka, Japan

[22] Filed: May 30, 1974

[21] Appl. No.: 474,772

Related U.S. Application Data

[63] Continuation-in-part of Ser. No. 387,699, Aug. 13, 1973, abandoned.

[52] U.S. Cl. ............... 279/47; 279/48; 279/1 ME; 308/8; 308/188
[51] Int. Cl. ........................................... B23b 31/20
[58] Field of Search ............ 279/47, 48, 49, 51, 52, 279/56, 58, 59, 69, 42, 1 ME; 308/6 R, 8, 22, 188

[56] References Cited
UNITED STATES PATENTS

| | | | |
|---|---|---|---|
| 2,784,976 | 3/1957 | Ondeck | 279/48 |
| 3,365,204 | 1/1968 | Benjamin et al. | 279/47 X |

FOREIGN PATENTS OR APPLICATIONS

| | | | |
|---|---|---|---|
| 165,956 | 7/1921 | United Kingdom | 279/69 |

*Primary Examiner*—Gil Weidenfeld
*Attorney, Agent, or Firm*—Wenderoth, Lind & Ponack

[57] ABSTRACT

A collet chuck with an improved engagement mechanism between a chuck body and a lock nut which is rotatably mounted on the chuck body. A helical groove is formed around the chuck body at the lower portion thereof. A similar helical groove is formed in the inner periphery of the lock nut correspondingly to the helical groove in the chuck body. The two helical grooves form a helical channel around the chuck body when the lock nut is mounted on the chuck body. A plurality of balls are inserted in the helical channel so as to permit the axial movement of the lock nut when the lock nut is rotated. Means for maintaining a part of the balls in the helical channel to constantly and tightly contact to one another is provided in the helical channel. The part of the balls exert friction on the helical channel walls thereby preventing the lock nut from loosening in respect to the chuck body.

2 Claims, 3 Drawing Figures

3,894,743

COLLET CHUCK

This is a continuation-in-part of Ser. No. 387,699, filed Aug. 13, 1973 now abandoned.

The present invention relates to collet chucks, and more particularly to a collet chuck with an improved lock nut which can be lightly and smoothly rotated.

In conventional collet chucks, an adapter and lock nut are engaged by means of a male screw and female screw formed on the outer and inner periphery thereof respectively. On gripping a cutting tool, the lock nut is rotated to cause a collet in the adapter to slide and contract about the shank of the cutting tool. However a great deal of labour is needed on rotating the lock nut due to contact friction between the male screw and the female screw of the adapter and the lock nut. To solve the above mentioned defect, there is proposed an improved arrangement in which the lock nut and the adapter are engaged through ball bearings. However this arrangement has also a defect that the lock nut often loosens in respect to the adapter by a slight shcok during cutting operation.

A primary object of the present invention is to obviate the defects of the conventional chucks, and to provide a collect chuck which is provided with a braking means for preventing the lock nut from loosening in respect to the adapter both of which are engaged through ball bearing arrangement.

Other objects and features of the present invention will be apparent from the following description of a preferred embodiment of the invention with reference to the accompanying drawings, in which.

Figure 1:
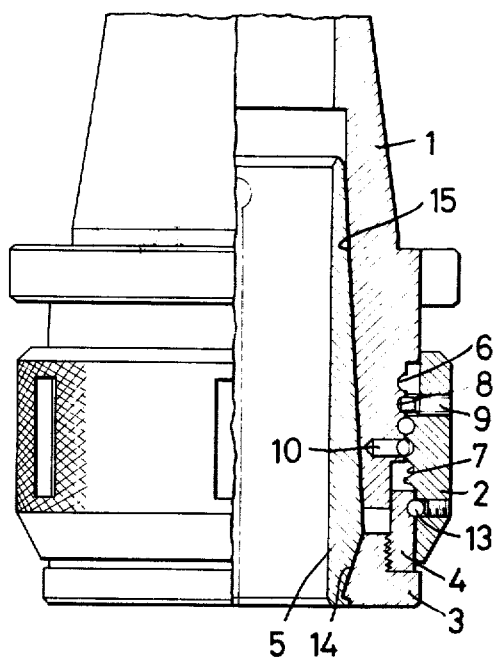
FIG. 1 is an elevation of a collet chuck according to the present invention, partially broken.
Figure 2:
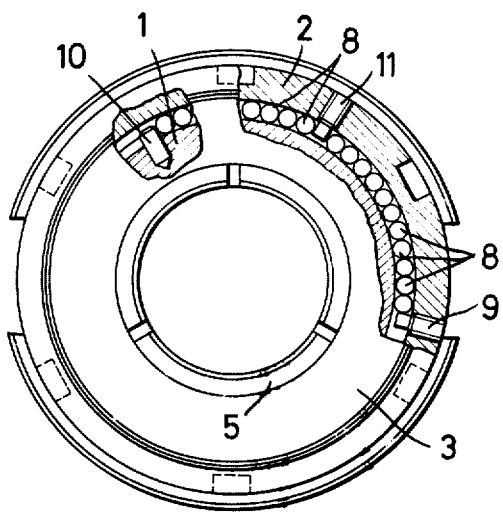
FIG. 2 is a bottom plan of the same, partially broken.

Referring now to the drawings, the numeral 1 is an adapter capable of being detachably fixed to a main spindle of a milling machine, boring machine or the like. The adapter 1 has at the lower portion thereof a conical bore 15 as shown in FIG. 1.

Around the lower periphery of the adapter 1 is formed a helical groove 6 having substantially semicircular section. A similar helical groove 7 is formed in the inner periphery of a lock nut 2 rotatably mounted on the lower portion of the adapter 1. Said groove 7 corresponds to the helical groove 6 on the adapter 1 to form a helical round channel between the adapter and the lock nut. A plurality of balls 8 are fitted in said helical channel thereby permitting the axial movement of the lock nut along the adapter by the rotation of the lock nut.

A stop 9 projecting in the helical groove 7 is fixed to the lock nut 2 at the upper end portion of the groove 7. A similar stop 10 projecting in the helical groove 6 is fixed to the adapter 1 at the lower end portion of the groove 6. Said stops 9 and 10 prevent the balls 8 from removing out of the helical channel. A further stop 11 projecting in the helical groove 7 is fixed to the lock nut at a lower position than said stop 9, so that the balls 8 positioning between the stops 9 and 11 tightly contact to one another so as to be non-rotatable and to exert friction on the helical channel, thereby serving as braking means for preventing loosening of the lock nut.

Figure 3:
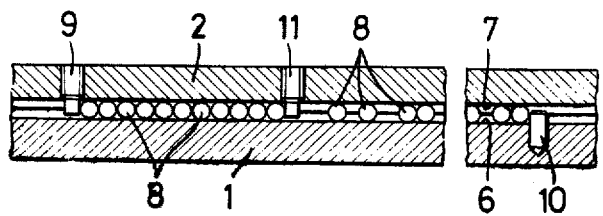
FIG. 3 is a development view of an engagement means between a lock nut and adapter.

Said stops 10 and 11 limit the downward movement of the lock nut at a position where the balls 8 are in a continuous line between the stops 10 and 11, which contact both ends of the line of balls and are prevented from approaching further in relation to one another. Therefore at a higher position of the lock nut, the line of balls 8 between the stops 10 and 11 are discontinuous as shown in FIG. 3 and the balls are rotatable, while the balls between the stops 9 and 11 maintain their contact with each other and non-rotatable.

A nose ring 3 is connected to the lock nut 2 through a cylindrical connecter 4 which is threaded on the nose ring and rotatable in relation to the lock nut through the intermediary of balls 13 which transmit the axial movement of the lock nut to the nose ring. The nose ring 3 has a bore 14 tapered reversely to the conical bore 15 as shown in FIG. 1.

A split collet 5 is accommodated in said bores 14 and 15 provided in the adapter and the nose ring respectively. The collet 5 has an outer periphery corresponding to said bores 14 and 15 and an inner periphery fittable around a straight shank of a cutting tool or the like. Though not shown in the drawings, expansion and contraction of the collet 5 is facilitated by means of axial notches provided in the periphery of the collet alternately from the upper and lower ends thereof.

In operation of the collet chuck according to the present invention as described above, a shank of a cutting tool is inserted in the collet 5 and the lock nut 2 is revolved. The axial advancement of the lock nut 2 along the adapter 1 through the balls 8 causes the nose ring 3 to advance since the lock nut 2 is connected to the nose ring 3 rotatably in relation thereto through the balls 13. On advancement of the nose ring, the collet is forced into the conical bore 15 and decreases its diameter by the sliding contact between the tapered periphery of the collet and the conical bore thereby constricting the shank of the cutting tool. At the same time by the tapered bore 14 of the nose ring the lower portion of the collet is constricted. As a result the shank of the cutting tool is firmly gripped in the collet.

During the above operation, since the lock nut and the adapter are engaged together by means of balls in the helical channel formed therebetween, the lock nut can be rotated with smaller force resulting in increase gripping efficiency of the collet, and at the same time the friction ball braking means prevents the lock nut from loosening after the cutting tool is gripped by the collet since the friction balls are non-rotatably inserted in the helical channel so as to exert friction thereon thereby obviating a risk that the lock nut is loosened by a slight shock to cause the cutting tool to displace out of the collet chuck during the cutting operation.

What is claimed is:

1. A collet chuck comprising a chuck body having a conical bore axially formed therein, a collet being longitudinally split and having a conical surface complementary to the conical bore of said chuck body, said collet being received in said conical bore and adapted to be contracted upon axial movement in said bore, a lock nut rotatably mounted on the chuck body, a nose ring rotatably connected to said lock nut and being circumferentially engagable with an end portion of said collet, said nose ring and said end portion of said collet having means for contracting said portion of the collet upon axial movement of the nose ring, a first helical groove formed in the inner periphery of said lock nut, a second helical groove formed around said chuck body correspondingly to said first helical groove, said first and second helical grooves forming a helical channel between the lock nut and the chuck body, a plurality of balls received in said helical channel and being in rolling contact therewith to permit the axial movement of said lock nut upon rotation of the lock nut, first and second stops projecting respectively in said first and second helical grooves so as to prevent removal of said balls out of said helical channel, said stops being spaced apart a sufficient distance to allow the balls therebetween to rotate relative to one another for reducing friction between the channel and the balls received between the stops to facilitate rotation of said lock nut, and means for holding some of said balls in said helical channel in tight frictional contact with one another to provide friction between the channel and said some of the balls to prevent the lock nut from becoming loose with respect to the chuck body when a tool has been gripped by said collet.

2. A collet chuck as claimed in claim 1, wherein said means comprises a third stop projecting in said first helical groove, said third stop co-operating with said first stop so as to hold some of the balls between said first and third stops in tight frictional contact with one another so as to be non-rotatable upon rotation of the lock nut while the other balls are rotatable.

* * * * *